Patented Feb. 5, 1929.

1,701,159

UNITED STATES PATENT OFFICE.

HARRY P. KIMBER, OF DETROIT, MICHIGAN, ASSIGNOR TO EARL HOLLEY, OF DETROIT, MICHIGAN.

DOUBLE COATING FOR PERMANENT MOLDS.

No Drawing.  Application filed July 1, 1926.  Serial No. 119,991.

This invention relates to an improved coating for the protection of the surface of cast iron molds which are used for the production of gray iron castings.

The coating is also adapted for protecting the surface of molds made of other metals and used for the production of castings of other materials.

The specific object of this invention is to improve the refractory qualities of the coating and to decrease the heat conductivity, and at the same time cause the coating to adhere to the surface of the metal mold with sufficient tenacity so that the coating would only need to be repaired after a large number of castings had been made in the mold.

I have discovered that if I take a solution in water of aluminum chloride containing 10% by weight and mix with this solution a refractory powdered substance, such as infusorial earth or fire clay, and stirring the mixture up until the mixture contains 20% by weight of the powdered refractory substance in suspension, and I take this solution and apply to a hot metal mold, for example to a cast iron mold heated to approximately 350° F., that by merely applying it with a brush, making two or three passes over the surface of the mold, a coating of about 0.01 of an inch in thickness will be produced.

In actual use the refractory coating is in its turn protected by a thick coating of lampblack, as described in the patent to Meloche, #1,492,694, dated May 6th, 1924.

When this refractory mixture is applied to the hot mold the aluminum chloride is decomposed, the chlorine acting on the metal mold to some extent, the aluminum being converted to aluminum oxide, $Al_2O_3$, which in itself is an excellent refractory. This substance is thus formed in the colloidal state. That is to say, in the form of particles which are ultramicroscopic in size. It has therefore the well known qualities of a colloid, and causes the suspended particles of fire clay to adhere to the surface.

The effect of the chlorine is, I believe, to slightly pit the surface of the iron so as to render the coating more adherent. Aluminum, bromide, fluoride or iodide will act equally well as the chloride, because bromine, iodine and fluorine are all members of the halogen group of elements and are patentably equivalent for the purpose considered.

What I claim is:—

1. A coating for protecting metal molds, consisting of an inert refractory insulating material and a small percentage of aluminum chloride acting as a binder only.

2. An insulating refractory wash for coating metal molds, consisting of a refractory powder in suspension and a small percentage of aluminum chloride in solution.

3. An insulating refractory wash for coating metal molds, comprising a ten per cent solution of aluminum chloride containing twenty per cent by weight of an inert powdered refractory substance in suspension.

4. An insulating refractory wash for coating metal molds, comprising a ten percent solution of aluminum chloride containing twenty percent by weight of infusorial earth in suspension.

In testimony whereof I affix my signature.

HARRY P. KIMBER.